(12) United States Patent
Horiguchi et al.

(10) Patent No.: US 10,857,563 B2
(45) Date of Patent: Dec. 8, 2020

(54) DISPENSER

(71) Applicants: KURARAY NORITAKE DENTAL INC., Kurashiki (JP); YOSHINO KOGYOSHO CO., LTD., Tokyo (JP)

(72) Inventors: Hirotaka Horiguchi, Kurashiki (JP); Kazuhisa Yoshimura, Tokyo (JP); Toru Toma, Tokyo (JP)

(73) Assignees: KURARAY NORITAKE DENTAL INC., Kurashiki (JP); YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/311,151

(22) PCT Filed: Jun. 30, 2017

(86) PCT No.: PCT/JP2017/024251
§ 371 (c)(1),
(2) Date: Dec. 18, 2018

(87) PCT Pub. No.: WO2018/004002
PCT Pub. Date: Jan. 4, 2018

(65) Prior Publication Data
US 2019/0176183 A1 Jun. 13, 2019

(30) Foreign Application Priority Data
Jun. 30, 2016 (JP) .................... 2016-129919

(51) Int. Cl.
*B05C 5/02* (2006.01)
*B05C 5/00* (2006.01)
(Continued)

(52) U.S. Cl.
CPC .................. *B05C 5/02* (2013.01); *B05C 5/00* (2013.01); *B05C 17/00576* (2013.01); *B05C 17/01* (2013.01); *B05C 17/014* (2013.01)

(58) Field of Classification Search
CPC ........ B05C 17/00516; B05C 17/00593; B05C 17/00576; B05C 17/014; B05C 5/024;
(Continued)

(56) References Cited

U.S. PATENT DOCUMENTS 4,215,701 A * 8/1980 Raitto ................ A61B 5/15003
600/576
4,266,557 A * 5/1981 Merry ............... A61M 5/31513
600/576
(Continued)

FOREIGN PATENT DOCUMENTS

JP S58-17862 A 2/1983
JP S60-151020 A 8/1985
(Continued)

OTHER PUBLICATIONS

Oct. 3, 2017 International Search Report issued in International Patent Application No. PCT/JP2017/024251.
(Continued)

*Primary Examiner* — Charles Cheyney
(74) *Attorney, Agent, or Firm* — Oliff PLC

(57) ABSTRACT

A dispenser can prevent leakage of contents from a nozzle tip when stopping discharging the contents. A dispenser includes: a syringe body that has a filled space of contents, and has a discharge hole at a tip thereof; a plunger that is slid in the syringe body by application of a pushing force, to discharge the contents in the filled space from the discharge hole; and a piston that is formed of an elastic material and located at a tip part of the plunger, wherein a gap is formed between an inner peripheral surface of the syringe body and an outer peripheral surface of the piston, when the plunger is pushed, the piston deforms to narrow the gap, and a back leakage risk (=(gap area/final discharge hole area)) after the deformation of the piston is 0 or more and less than 1.

13 Claims, 9 Drawing Sheets

(51) Int. Cl.
*B05C 17/01* (2006.01)
*B05C 17/005* (2006.01)

(58) Field of Classification Search
CPC . B05C 5/02; A61M 5/31513; A61M 5/31511; A61M 5/31515
USPC ..... 604/228, 125, 218, 222; 222/386, 386.5, 222/325, 137
See application file for complete search history.

(56) References Cited

U.S. PATENT DOCUMENTS

| | | | | |
|---|---|---|---|---|
| 4,303,070 A | * | 12/1981 | Ichikawa | A61M 5/31513 604/222 |
| 4,543,093 A | * | 9/1985 | Christinger | A61M 5/31513 604/228 |
| 4,645,098 A | * | 2/1987 | Hoffmann | F16J 15/48 222/386 |
| 4,907,727 A | * | 3/1990 | Ernst | B05C 17/00576 222/137 |
| 5,314,416 A | * | 5/1994 | Lewis | A61M 5/31513 600/576 |
| 6,142,977 A | * | 11/2000 | Kolberg | A61L 2/07 604/218 |
| 6,984,222 B1 | * | 1/2006 | Hitchins | A61M 5/14546 604/218 |
| 8,613,730 B2 | * | 12/2013 | Hieb | A61M 5/007 604/218 |
| 8,740,856 B2 | * | 6/2014 | Quinn | A61M 5/31511 604/228 |
| 9,286,557 B2 | * | 3/2016 | Deffeyes | G06K 19/06037 |

FOREIGN PATENT DOCUMENTS

| | | |
|---|---|---|
| JP | 2001-057987 A | 3/2001 |
| JP | 2005-237780 A | 9/2005 |
| JP | 2009-240427 A | 10/2009 |
| JP | 2010-142573 A | 7/2010 |
| JP | 2011-115585 A | 6/2011 |

OTHER PUBLICATIONS

Jan. 28, 2020 extended Search Report issued in European Patent Application No. 17820356.8.
Aug. 11, 2020 Office Action issued in Chinese Patent Application No. 201780037796.X.

* cited by examiner

DISPENSER

CROSS REFERENCE TO RELATED APPLICATION

This application claims priority to and the benefit of Japanese Patent Application No. 2016-129919 filed on Jun. 30, 2016, the entire disclosure of which is incorporated herein by reference.

TECHNICAL FIELD

The present disclosure relates to a dispenser suitable for discharging contents, and is intended to prevent leakage of contents from a nozzle tip when discharge operation is stopped.

BACKGROUND

In dental practice and the like, a highly viscous pasty material such as a filler or an adhesive is often used, typically through the use of a syringe-type dispenser that discharges contents from a small-diameter nozzle by pressing a plunger.

In this type of dispenser, the contents in the plunger are usually discharged separately a plurality of times (i.e. the contents are not completely discharged in one operation). In the case where the operation of the plunger is suspended in order to stop discharging the contents, the pressing force applied to the plunger may remain in the contents-filled space as residual pressure. When this occurs, the contents leak from the tip of the nozzle despite the discharge of the contents being stopped. Thus, discharging an appropriate amount of contents is difficult, and expensive contents cannot be used without any waste.

In view of this, the following extrusion portion structure of a dental viscous material container has been proposed: the groove bottom of an O-ring mounting groove is shaped so as to narrow continuously or stepwise toward the back end of the container body, and the interval between the bottom and the container body inner surface at a position at a distance of 0.5 times the diameter of the cross section in an unloaded state of the O-ring from the position (back) farthest from the nozzle side toward the nozzle side (front) is set to greater than or equal to 0.85 times the diameter of the cross section in an unloaded state of the O-ring, to apply an appropriate resistance to the O-ring so that the O-ring twists upon plunger pressing operation. When the discharge of the contents is stopped, the plunger moves backward by the restoring force of the O-ring. Leakage of the contents is thus prevented (for example, see JP 2001-57987 A (PTL 1)).

CITATION LIST

Patent Literature

PTL 1: JP 2001-57987 A

SUMMARY

However, such an extrusion portion structure has the following problem. Given that the size of the container itself is small, the dimensions of the structural members need to be very accurate in order to cause the O-ring to twist. Thus, quality control is difficult, and efficient manufacture cannot be achieved. Besides, when setting the plunger in the container body, the O-ring held in the groove may move to the farthest position in the groove from the nozzle side due to the resistance with the container body. In such a case, in plunger pressing operation, the O-ring cannot be twisted in the groove, and leakage of the contents from the nozzle tip cannot be prevented.

It could be helpful to provide a dispenser that can prevent leakage of contents from a nozzle tip when stopping discharging the contents.

Solution to Problem

A dispenser according to the present disclosure comprises: a syringe body that has a filled space of contents, and has a discharge hole at a tip thereof; a plunger that is slid in the syringe body by application of a pushing force, to discharge the contents in the filled space from the discharge hole; and a piston that is formed of an elastic material and located at a tip part of the plunger, wherein a gap is formed between an inner peripheral surface of the syringe body and an outer peripheral surface of the piston, when the plunger is pushed, the piston deforms to narrow the gap, and a back leakage risk after the deformation of the piston is 0 or more and less than 1, the back leakage risk being calculated by dividing an area of the gap by an area of the final discharge hole.

Preferably, the discharge hole is formed by attaching a needle tip to the tip of the syringe body.

Preferably, Shore hardness of the piston measured by a JIS K 6253 type A durometer is 30 or more and 80 or less.

Preferably, an area ratio calculated by dividing a cross-sectional area of inside of the syringe body by the area of the final discharge hole is 20 or less.

Preferably, a protrusion portion that prevents the plunger from separating from the syringe body is provided at the inner peripheral surface of the syringe body.

Preferably, a sliding portion that protrudes outward and slides on the inner peripheral surface of the syringe body is provided at an outer peripheral surface of at least one of the plunger and the piston.

Preferably, an inclined portion that decreases in diameter toward the discharge hole is provided at a tip of the plunger, the piston includes: a ring-shaped seal portion that forms the gap with the inner peripheral surface of the syringe body; and a tip wall that covers an inner peripheral surface of the seal portion from a tip side, and the seal portion moves in a back end direction along the inclined portion and increases in diameter by a reaction force from the contents in the filled space against the pushing of the plunger, and, when the pushing is stopped, moves in a tip direction and decreases in diameter by an elastic force of the tip wall.

Preferably, the piston includes: a back end portion that abuts the plunger and is prevented from being displaced in a back end direction; a sidewall that extends from the back end portion in a tip direction; and a tip wall that covers the sidewall from a tip side, at least one of an inner peripheral surface and an outer peripheral surface of the sidewall is shaped to project outward, and the sidewall forms the gap with the inner peripheral surface of the syringe body, and the tip wall moves in the back end direction by a reaction force from the contents in the filled space against the pushing of the plunger, and the sidewall is displaced outward with the movement of the tip wall.

Advantageous Effect

With the dispenser according to the present disclosure, leakage of the contents from the nozzle tip can be prevented when stopping discharging the contents. Moreover, after filling the syringe body with the contents, the plunger and the piston can be installed easily while letting air in the filled space escape in the back end direction.

DETAILED DESCRIPTION

Detailed description is given below, with reference to drawings.

Figure 1:
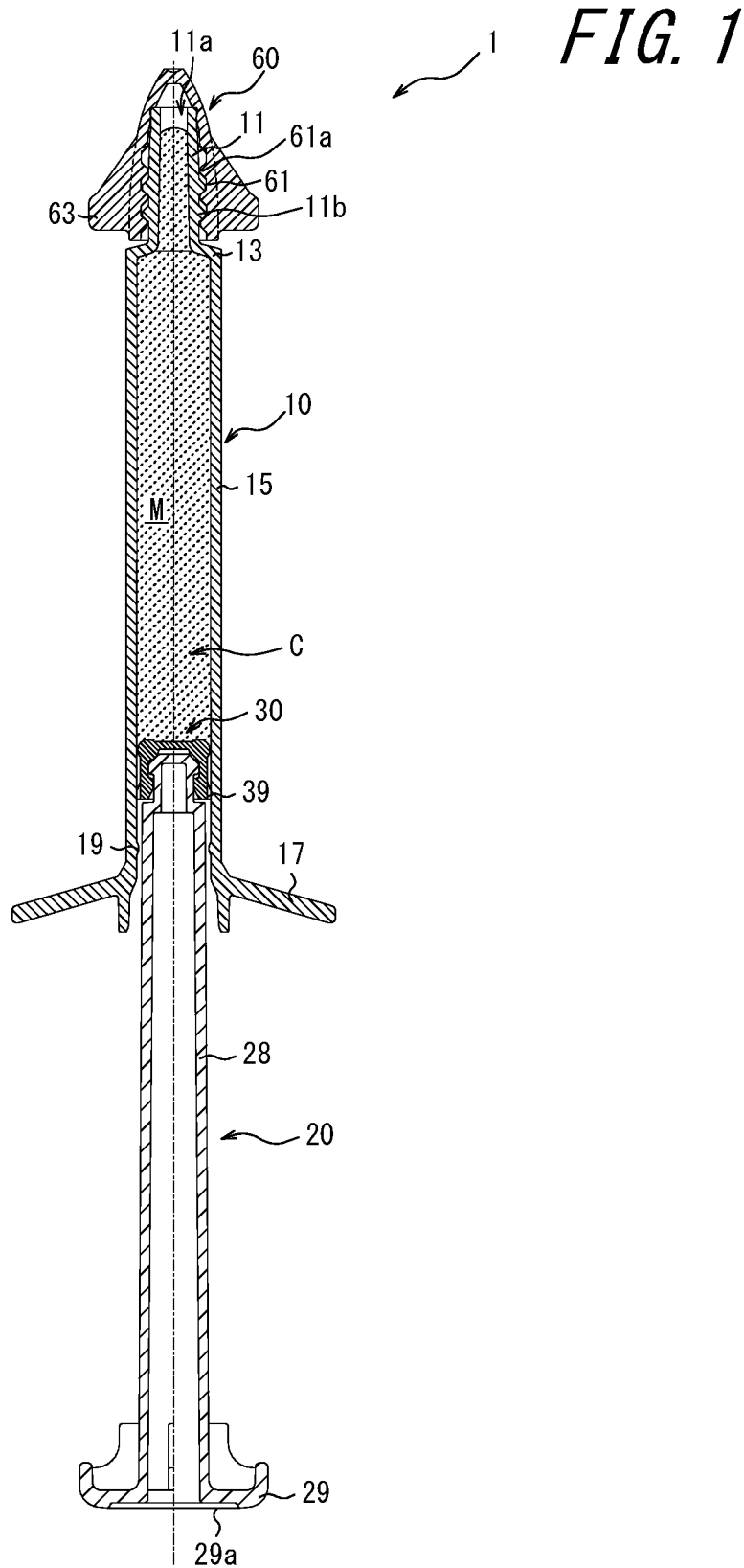
FIG. 1 is a sectional diagram illustrating a dispenser (immediately before start of use) according to Embodiment 1 of the present disclosure.
Figure 2:
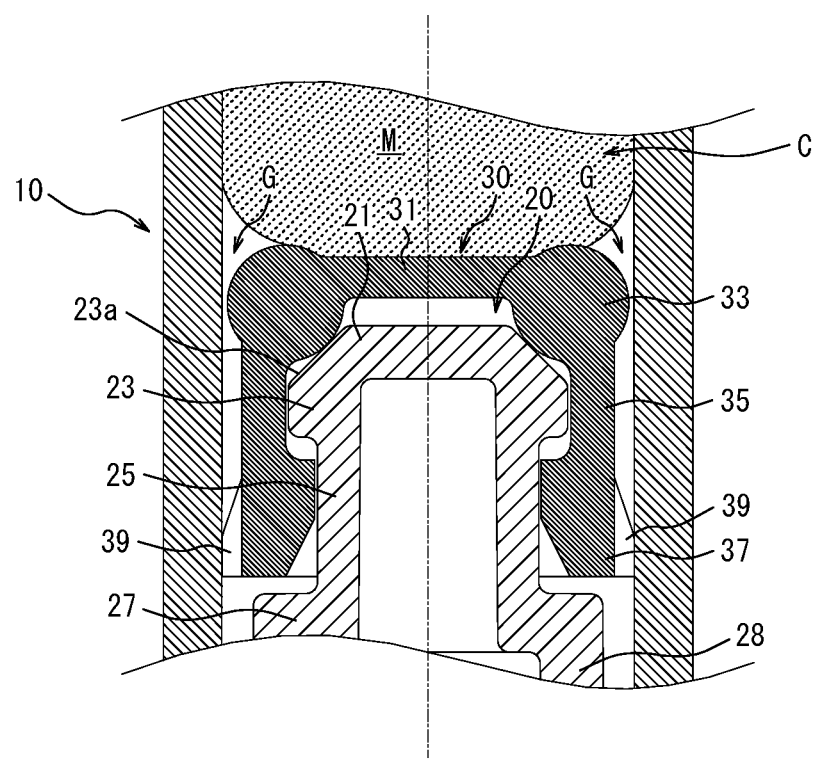
FIG. 2 is an enlarged sectional diagram of a plunger tip part and a piston part in FIG. 1.

FIG. 1 is a sectional diagram illustrating the structure of a dispenser 1 according to Embodiment 1 of the present disclosure. FIG. 2 is an enlarged sectional diagram of a tip part of a plunger 20 and a part of a piston 30. The dispenser 1 illustrated in FIGS. 1 and 2 is in a state immediately before being used by the user.

The dispenser 1 according to this embodiment includes: a syringe body 10 that is cylindrical and has its tip and back end open; a plunger 20 that is slid in the syringe body 10 to discharge contents C in a filled space M from a tip opening 11a; a piston 30 that is formed of an elastic member attached to a tip part of the plunger 20; and a cap 60 that covers the tip opening 11a of the syringe body 10. It is assumed in the description, the claims, the abstract, and the drawings that the side at which the below-mentioned cap 60 is located is the tip side (the upper side in FIG. 1) and the side at which a flange 29 of the plunger 20 is located is the back end side (the lower side in FIG. 1).

The syringe body 10 forms the filled space M of the contents C inside a barrel portion 15, and has the tip opening 11a at its tip cylindrical portion 11. A male screw portion 11b for fixing the below-mentioned cap 60 or nozzle 40 by screw engagement is provided at the outer peripheral surface of the tip cylindrical portion 11. An annular projection 19 protruding inward (i.e. toward the axis of the dispenser) to prevent the plunger 20 and the piston 30 from slipping off is provided at the inner peripheral surface of the syringe body 10 near the back end. A collar 17 on which the user places his or her fingers when pushing the plunger 20 is provided at the back end of the syringe body 10. The collar 17 may have a polygonal shape to prevent the dispenser 1 from rolling when laid down.

The plunger 20 is slid in the syringe body 10 in the tip direction (i.e. toward the tip), to press the contents C in the filled space M and discharge the contents C to the outside through the tip opening 11a. The plunger 20 has, at the tip of a rod portion 28 extending toward the tip opening 11a, a groove portion 25 reduced in diameter in the radial direction and a protrusion portion 23 protruding in the radial direction, as illustrated in FIGS. 1 and 2. Each of the rod portion 28, the groove portion 25, and the protrusion portion 23 forms a gap with the inner peripheral surface of the barrel portion 15 of the syringe body 10. By engagement of a back end portion 37 of the piston 30 made of an elastic material such as rubber with the groove portion 25, the piston 30 is fixed to the tip of the plunger 20. The protrusion portion 23 has an inclined portion 23a that decreases in diameter in the tip direction, and a seal portion 33 moves inward and outward (i.e. away from the axis of the dispenser) along the inclined portion 23a as described later. A flange 29 is provided at the back end of the plunger 20. By the user pushing a pressing surface 29a of the flange 29, the contents C in the filled space M are discharged to the outside.

The material that can be used for the syringe body 10 and the plunger 20 may be any of various thermoplastic resins such as polyolefin, polyester, polyether, and polystyrene. Typical examples of the polyolefin material include polypropylene (PP) and polyethylene (PE). Typical examples of the polyester material include polyethylene terephthalate (PET) and polybutylene terephthalate (PBT). Typical examples of the polyether material include polyoxymethylene (POM). Typical examples of the polystyrene resin include AS and ABS. The material is selected as appropriate depending on the use and the contents C.

The piston 30 is formed of an elastic member such as rubber. As illustrated in FIG. 2, the piston 30 includes: the ring-shaped seal portion 33 that forms a gap G with the inner peripheral surface of the syringe body 10; a tip wall 31 that covers the inner peripheral surface of the seal portion 33 from the tip side; a sidewall 35 that extends from the seal portion 33 along the barrel portion 15 in the back end direction (i.e. toward the back end); the back end portion 37 that protrudes inward to engage with the groove portion 25 and fix the piston 30 to the plunger 20; and a sliding rib 39 that slides on the inner peripheral surface of the syringe body 10. The outer peripheral surface of the seal portion 33 of the piston 30 forms the gap G with the inner peripheral surface of the syringe body 10. In FIG. 2, the seal portion 33 is substantially not in contact with the inner peripheral surface of the syringe body 10 throughout its outer peripheral surface. The seal portion 33 abuts the inclined portion 23a in the protrusion portion 23 of the plunger 20. The piston 30 as a whole covers the protrusion portion 23 of the plunger 20.

The diameter of the outer peripheral surface of the sliding rib 39 is slightly greater than the diameter of the inner peripheral surface of the syringe body 10. Hence, in a state in which the plunger 20 and the piston 30 are inserted in the filled space M of the syringe body 10, the sliding rib 39 elastically deforms inward along the inner peripheral surface of the syringe body 10, and exerts a pressing force on the inner peripheral surface of the syringe body 10. This pressing force induces an axial friction force between the syringe body 10 and the piston 30. Therefore, for example even when the position of the dispenser 1 is changed so that the plunger 20 is located below as illustrated in FIG. 1, the plunger 20 and the piston 30 can be prevented from slipping off the syringe body 10 under their own weights because the friction force acts between the sliding rib 39 and the inner peripheral surface of the syringe body 10. The sliding rib 39 (sliding portion) may be provided intermittently in the circumferential direction, and the number of ribs and the intervals between the ribs may be freely set.

The annular projection 19 protruding inward is provided at the inner peripheral surface of the syringe body 10 near the back end. Even in the case where the plunger 20 is pulled in the back end direction intentionally or a predetermined friction force is not exerted between the sliding rib 39 and the inner peripheral surface of the syringe body 10, the sliding rib 39 of the piston 30 engages in undercutting with the annular projection 19, so that the plunger 20 can be reliably prevented from slipping off the syringe body 10 without further moving in the back end direction. The annular projection 19 may be provided at a plurality of separate positions in the circumferential direction.

The shapes of the plunger 20 and the piston 30 are not limited to those described above, and may be any shapes with which the gap G narrows when the plunger 20 pushes the contents C in the filled space M.

The material of the piston 30 may be any of silicon rubber, synthetic rubber, butyl rubber, fluororubber, and the like. In terms of the resistance to the contents, the piston 30 is preferably made of silicon rubber.

The cap 60 is a member attached to block the tip opening 11a of the syringe body 10. A female screw portion 61a is provided at the inner peripheral surface of a cap sidewall 61. By screw engagement of the female screw portion 61a with the male screw portion 11b of the syringe body 10, the cap 60 is fixed to the tip of the syringe body 10. A cap rib 63 protruding outward is provided at the outer peripheral surface of the cap sidewall 61. The user or the like can easily attach or remove the cap 60 to or from the syringe body 10 while holding the cap rib 63.

The material of the cap 60 may be any of various thermoplastic resins such as polyolefin, polyester, polyether, and polystyrene.

To discharge the contents C from the dispenser 1 illustrated in FIGS. 1 and 2, as a preparatory step, the manufacturer first fills the filled space M of the syringe body 10 with the contents C. The manufacturer then pushes the plunger 20 into the syringe body 10 in the tip direction, in a state in which the cap 60 is removed from the syringe body 10. After the manufacturer starts pushing the plunger 20, when the piston 30 is not yet in contact with the contents C in the filled space M, there is the gap G between the seal portion 33 and the inner peripheral surface of the syringe body 10. Accordingly, the air in the filled space M escapes in the back end direction through the gap G. This enables the manufacturer to push the plunger 20 in the tip direction with little resistance. By pushing the plunger 20, the manufacturer causes the seal portion 33 and the tip wall 31 of the piston 30 to abut the contents C. As a result of further pushing the plunger 20, the piston 30 is subjected to a reaction force from the contents C, and the gap G narrows (the reason why the gap G changes will be explained in detail later). The contents C are thus prevented from leaking in the back end direction. The manufacturer may further push the plunger 20 until the contents C are slightly discharged from the tip opening 11a, to make sure that the piston 30 abuts the contents C. Once the manufacturer has stopped pushing the plunger 20, the piston 30 is no longer subjected to the reaction force from the contents C as the pressing force from the plunger 20 is no longer exerted, so that the gap G returns to the original state (the state in FIG. 2). Thus, the positive pressure in the filled space M is released, preventing leakage of the contents C from the tip opening 11a. After performing this preparatory step to make the dispenser 1 usable by the user, the manufacturer attaches the cap 60 to the syringe body 10 to block the tip opening 11a. The manufacturer then packs the dispenser 1, and ships it to the user.

Figure 3:
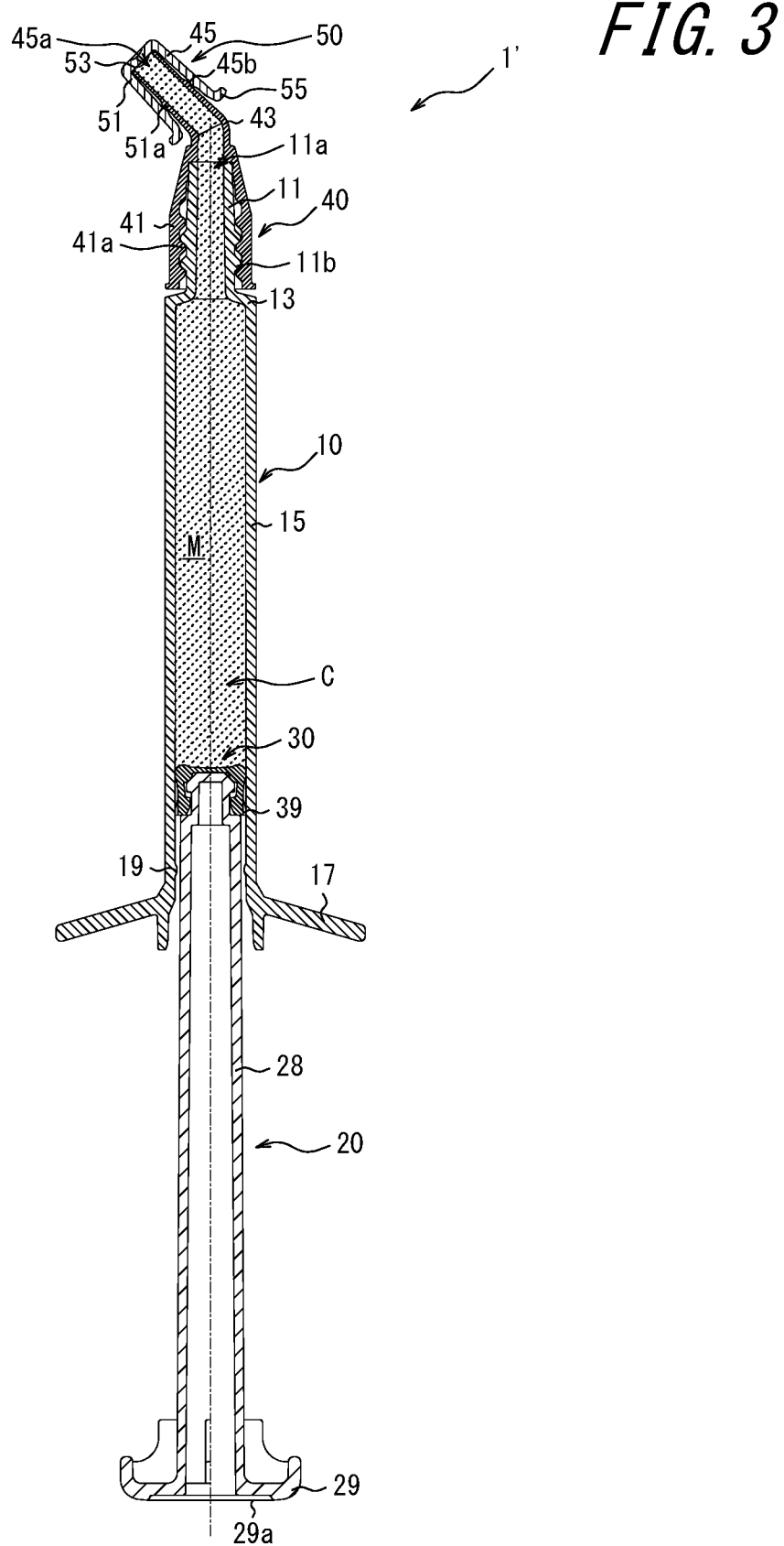
FIG. 3 is a sectional diagram illustrating the dispenser (after start of use) according to Embodiment 1 of the present disclosure.

The user removes the cap 60 of the dispenser 1 that has been made usable as a result of the preparatory step, and instead attaches the nozzle 40 for discharging the contents C. FIG. 3 illustrates a state in which the nozzle 40 is attached. A nozzle lid 50 is provided at the tip of the nozzle 40. Reference sign 1' is the dispenser to which the nozzle 40 is attached.

The nozzle 40 guides the contents C from the tip opening 11a of the syringe body 10 in a predetermined direction at a bend portion 43, and then guides the contents C through a nozzle cylindrical portion 45 to the outside from a nozzle opening 45a at the tip. For example, the nozzle 40 may be a needle tip illustrated in FIG. 3. A nozzle cap 41 is provided on the back end side of the nozzle 40. By screw engagement of a female screw portion 41a provided at the inner peripheral surface of the nozzle cap 41 with the male screw portion 11b of the syringe body 10, the nozzle 40 is fixed to the tip of the syringe body 10.

A nozzle lid 50 covers the nozzle opening 45a to protect the contents C from light and prevent entry of foreign material, in an unused state of the dispenser 1'. The nozzle lid 50 has a projection portion 51a at the inner peripheral surface of a sidewall 51, and is fixed to the nozzle 40 by the projection portion 51a engaging in undercutting with a projection portion 45b provided at the outer peripheral surface of the nozzle cylindrical portion 45 of the nozzle 40.

Figure 4:
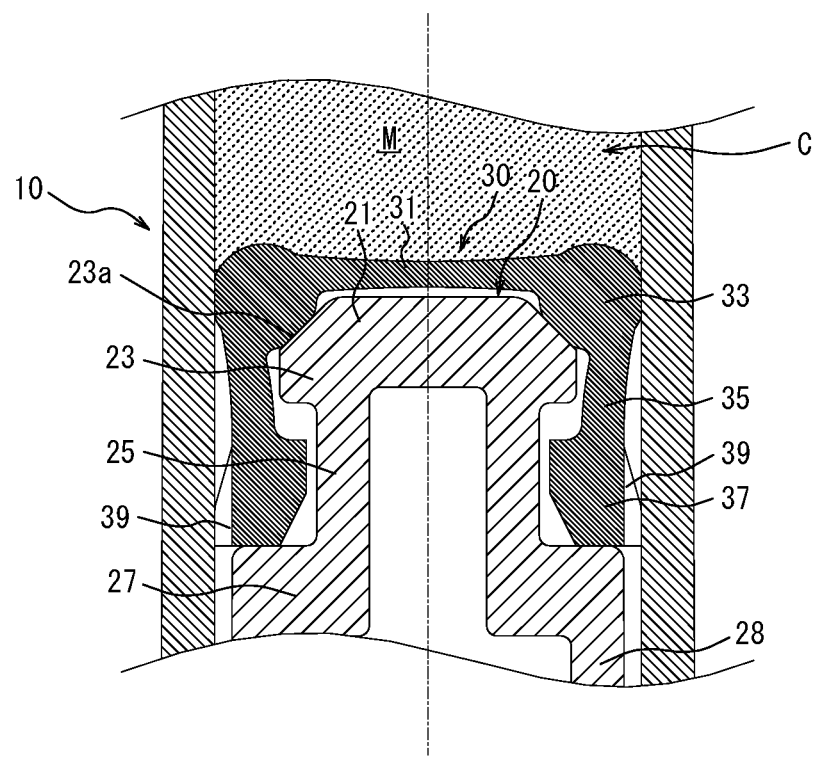
FIG. 4 is an enlarged sectional diagram of the plunger tip part and the piston part in FIG. 3, and illustrates a state in which the gap between the piston and the syringe inner peripheral surface is sealed by pushing the plunger.

To discharge the contents C, the user first holds a projection 55 provided at the back end of the nozzle lid 50 and removes the nozzle lid 50 from the dispenser 1'. The user then presses the pressing surface 29a of the plunger 20 by, for example, the thumb with the forefinger and the middle finger being placed on the collar 17 of the syringe body 10, to push the plunger 20 into the syringe body 10 in the tip direction. At this stage, the seal portion 33 and the tip wall 31 of the piston 30 already abut the contents C. Accordingly, when the plunger 20 is further pushed, the ring-shaped seal portion 33 of the piston 30 moves in the back end direction relative to the plunger 20 while abutting the inclined portion 23a, by the reaction force from the contents C. Here, the seal portion 33 is subjected to an outward force from the inclined portion 23a, and thus stretches outward against the elastic force of the tip wall 31 as illustrated in FIG. 4. This narrows the gap G between the seal portion 33 and the inner peripheral surface of the syringe body 10. In the example illustrated in FIG. 4, the gap G is zero. When the user pushes the plunger 20 in a state in which the gap G is zero, the air and the contents C in the filled space M can no longer escape in the back end direction, and positive pressure develops in the filled space M. This positive pressure in the filled space M causes the contents C to be discharged to the outside through the tip opening 11a of the tip cylindrical portion 11 and the nozzle opening 45a of the nozzle cylindrical portion 45.

The nozzle 40 may be made of any of various thermoplastic resins such as polyolefin, polyester, polyether, and polystyrene. Alternatively, the nozzle may have its tip part made of metal, glass, ceramic, or the like. A nozzle made of metal and having a small diameter may be used instead of the nozzle 40 illustrated in FIG. 3.

Herein, the opening located closest to the tip when the contents C are discharged to the outside is the final discharge hole. In this embodiment, the nozzle opening 45a of the nozzle 40 is the final discharge hole. In the case where the nozzle 40 is not attached, the tip opening 11a of the syringe body 10 is the final discharge hole. The proportion of the area of the gap G between the seal portion 33 and the inner peripheral surface of the syringe body 10 upon pushing the plunger 20 to the area of the final discharge hole is defined as "back leakage risk". As the area of the gap G, the minimum value of the area between the seal portion 33 and the inner peripheral surface of the syringe body 10 on a plane perpendicular to the moving direction (axial direction) of the plunger 20 may be used. The back leakage risk (=(gap (G) area/final discharge hole area)) is preferably 0 or more and less than 1. In this embodiment, the proportion is 0. If the back leakage risk is less than 1, the area of the gap G which is the opening on the back end side of the filled space M is smaller than the area of the final discharge hole which is the opening on the tip side of the filled space M, so that the contents C subjected to the positive pressure are easily discharged from the final discharge hole having a larger area, i.e. the nozzle opening 45a. With reduction in the gap G, the seal portion 33 and the tip wall 31 can prevent leakage of the contents C in the back end direction. Moreover, when setting the plunger 20 and the piston 30 in the syringe body 10, the gap G between the piston 30 and the syringe body 10 is present without being sealed, and thus the plunger 20 can be pushed with a light force without being subjected to a high friction resistance.

When the plunger 20 is not pushed in the tip direction, the gap G between the seal portion 33 and the inner peripheral surface of the syringe body 10 returns to the original state illustrated in FIG. 2 by the restoring force of the piston 30 which is an elastic body. Accordingly, upon stopping pushing the plunger 20 after discharging the contents C, the positive pressure in the filled space M is released promptly through the gap G. This prevents the contents C from leaking from the nozzle opening 45a due to the residual pressure in the filled space M after the pressing of the plunger 20 is stopped.

When attaching the plunger 20 and the piston 30 to the syringe body 10 after filling the syringe body 10 with the contents C, the plunger 20 and the piston 30 can be easily attached with little resistance while letting the air in the filled space M escape through the gap G in the back end direction.

Moreover, by attaching a needle tip as the nozzle 40 to discharge the contents C, the discharge can be performed optimally depending on the liquid quality, use, etc. of the contents C. In this case, the opening of the tip portion of the needle tip is the final discharge hole.

The contents C are not limited to any particular type, and may be selected as appropriate depending on the use and the like. Examples include dental materials such as a filler and an adhesive. The contents C are preferably a pasty material having certain viscosity, in terms of enhancing the advantageous effects according to the present disclosure. Regarding the viscosity of the contents C, the consistency of the contents C is preferably 60 mm or less, more preferably 50 mm or less, and further preferably 40 mm or less. The consistency of the contents C may be 30 mm or less, 20 mm or less, or 15 mm or less. The consistency herein is measured as follows: For the contents (C) left to stand at 25° C. for 2 hr, 0.5 mL of the contents C are gently extruded onto a central part of a glass plate (10 cm×10 cm) with a polyester film (10 cm×10 cm) laid thereon using a glass tube having an inner diameter of 8 mm, in a constant temperature chamber of 25° C. (humidity: 40%). A polyester film (10 cm×10 cm) is placed to cover the contents C, and further a glass plate (10 cm×10 cm) of 40 g is put on the polyester film. This is left to stand for 30 sec, after which the glass plate is removed. The arithmetic mean value of the measured major axis and minor axis of the spreading contents C is taken to be the consistency. The major axis is the longest diameter passing through the center of the spreading contents C, and the minor axis is the diameter passing through the center of the spreading contents C and orthogonal to the major axis.

The Shore hardness of the rubber material forming the piston 30 measured by a JIS K 6253 type A durometer is 30 or more and 80 or less. Thus, the gap G can be reduced effectively by the reaction force from the contents C in the filled space M against the pressing of the plunger 20 to prevent leakage of the contents C in the back end direction, and the gap G can be restored promptly by stopping the pressing of the plunger 20 to release the residual pressure in the filled space M and prevent leakage of the contents C from the nozzle opening 45a. The structure of the piston 30 is, however, not limited to such.

The proportion of the cross-sectional area of the inside of the barrel portion 15 of the syringe body 10 to the area of the nozzle opening 45a which is the final discharge hole is defined as "area ratio". This area ratio (=(syringe inside cross-sectional area/final discharge hole area)) is limited to 20 or less. Thus, the ratio of the discharge speed of the contents C from the nozzle opening 45a to the pushing speed of the plunger 20 is a predetermined value or less. Leakage of the contents C from the nozzle opening 45a after stopping pushing the plunger 20 can be prevented more reliably in this way. The structures of the syringe body 10 and the nozzle 40 are, however, not limited to such.

As described above, according to this embodiment, pushing the plunger 20 causes the piston 30 to deform to reduce the gap G so that the back leakage risk is 0 or more and less than 1. Hence, when discharging the contents C, leakage of the contents C in the back end direction can be prevented. Moreover, after stopping pressing the plunger 20, the gap G is restored to release the residual pressure in the filled space M and prevent leakage of the contents C from the nozzle opening 45a. In addition, when attaching the plunger 20 and the piston 30 to the syringe body 10 after filling the syringe body 10 with the contents C, the plunger 20 and the piston 30 can be easily attached with little resistance.

Furthermore, a needle tip can be attached to the tip, so that discharge can be performed optimally depending on the liquid quality, use, etc. of the contents C.

According to this embodiment, the Shore hardness of the rubber material forming the piston 30 measured by a JIS K 6253 type A durometer is 30 or more and 80 or less. Thus, the gap G can be reduced effectively to prevent leakage of the contents C in the back end direction. Moreover, by stopping the pressing of the plunger 20, the residual pressure in the filled space M can be released promptly to prevent leakage of the contents C from the nozzle opening 45a.

According to this embodiment, the proportion (area ratio) of the cross-sectional area of the inside of the barrel portion 15 of the syringe body 10 to the area of the nozzle opening 45a is 20 or less. Leakage of the contents C from the nozzle opening 45a after stopping pushing the plunger 20 can thus be prevented more reliably.

According to this embodiment, the sliding rib 39 protrudes outward from the outer peripheral surface of the piston 30 and slides on the inner peripheral surface of the syringe body 10. Therefore, even when the position of the dispenser 1 or 1' is changed so that the plunger 20 is located below as illustrated in FIGS. 1 and 3, the plunger 20 and the piston 30 can be prevented from slipping off the syringe body 10 under their own weights because the friction force acts between the sliding rib 39 and the inner peripheral surface of the syringe body 10.

According to this embodiment, the annular projection 19 protruding inward is provided at the inner peripheral surface of the syringe body 10 near the back end. Even in the case where the plunger 20 is pulled in the back end direction intentionally or a predetermined friction force is not exerted between the sliding rib 39 and the inner peripheral surface of the syringe body 10, the sliding rib 39 of the piston 30 engages in undercutting with the annular projection 19, so that the plunger 20 and the piston 30 can be reliably prevented from slipping off the syringe body 10.

Figure 5:
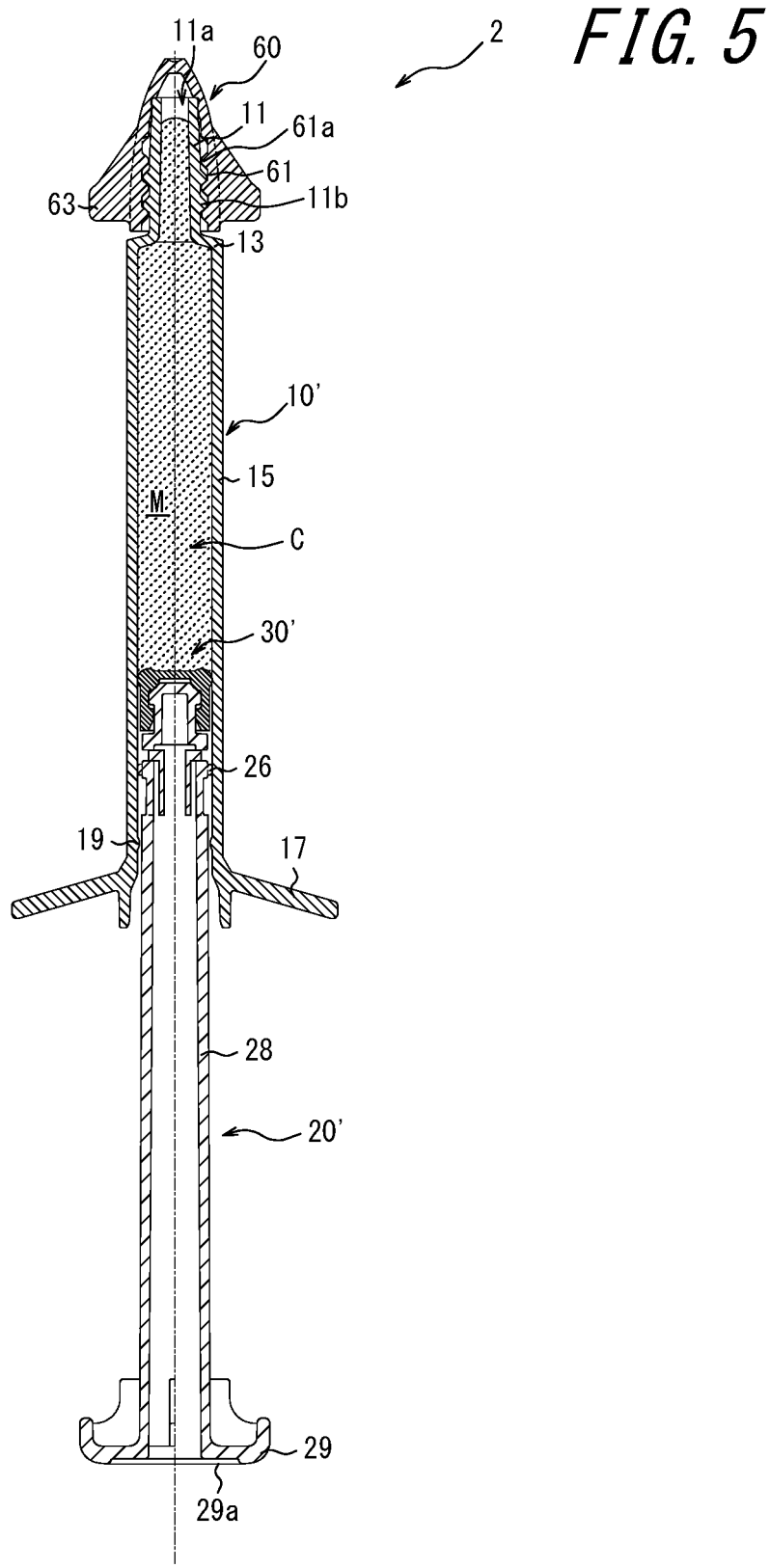
FIG. 5 is a sectional diagram illustrating a dispenser (immediately before start of use) according to Embodiment 2 of the present disclosure.

FIG. 5 is a sectional diagram illustrating the structure of a dispenser 2 according to Embodiment 2 of the present disclosure. The dispenser 2 according to Embodiment 2 is the same as the dispenser according to Embodiment 1 except that a sliding projection portion 26 is provided in a plunger 20' instead of providing the sliding rib 39 in the piston 30. The differences from Embodiment 1 are mainly described below.

The plunger 20' is slid in a syringe body 10' in the tip direction, to press the contents C in the filled space M and discharge the contents C through the tip opening 11a. As illustrated in FIG. 5, the plunger 20' has the sliding projection portion 26 protruding outward, at the tip of the rod portion 28 extending toward the tip opening 11a. The sliding projection portion 26 is provided at a plurality of separate positions in the circumferential direction. The diameter of the outer peripheral surface of the sliding projection portion 26 is slightly greater than the diameter of the inner peripheral surface of the syringe body 10'. Hence, in a state in which the plunger 20' is inserted in the filled space M of the syringe body 10', the sliding projection portion 26 elastically deforms inward along the inner peripheral surface of the syringe body 10', and exerts a pressing force on the inner peripheral surface of the syringe body 10'. This pressing force causes an axial friction force between the syringe body 10' and the plunger 20'. Therefore, for example even when the position of the dispenser 2 is changed so that the plunger 20' is located below as illustrated in FIG. 5, the plunger 20' can be prevented from slipping off the syringe body 10' under its own weight because the friction force acts between the sliding projection portion 26 and the inner peripheral surface of the syringe body 10'. The sliding projection portion 26 may be provided intermittently in the circumferential direction, and the number of projection portions and the intervals between the projection portions in the circumferential direction may be freely set.

Figure 6:
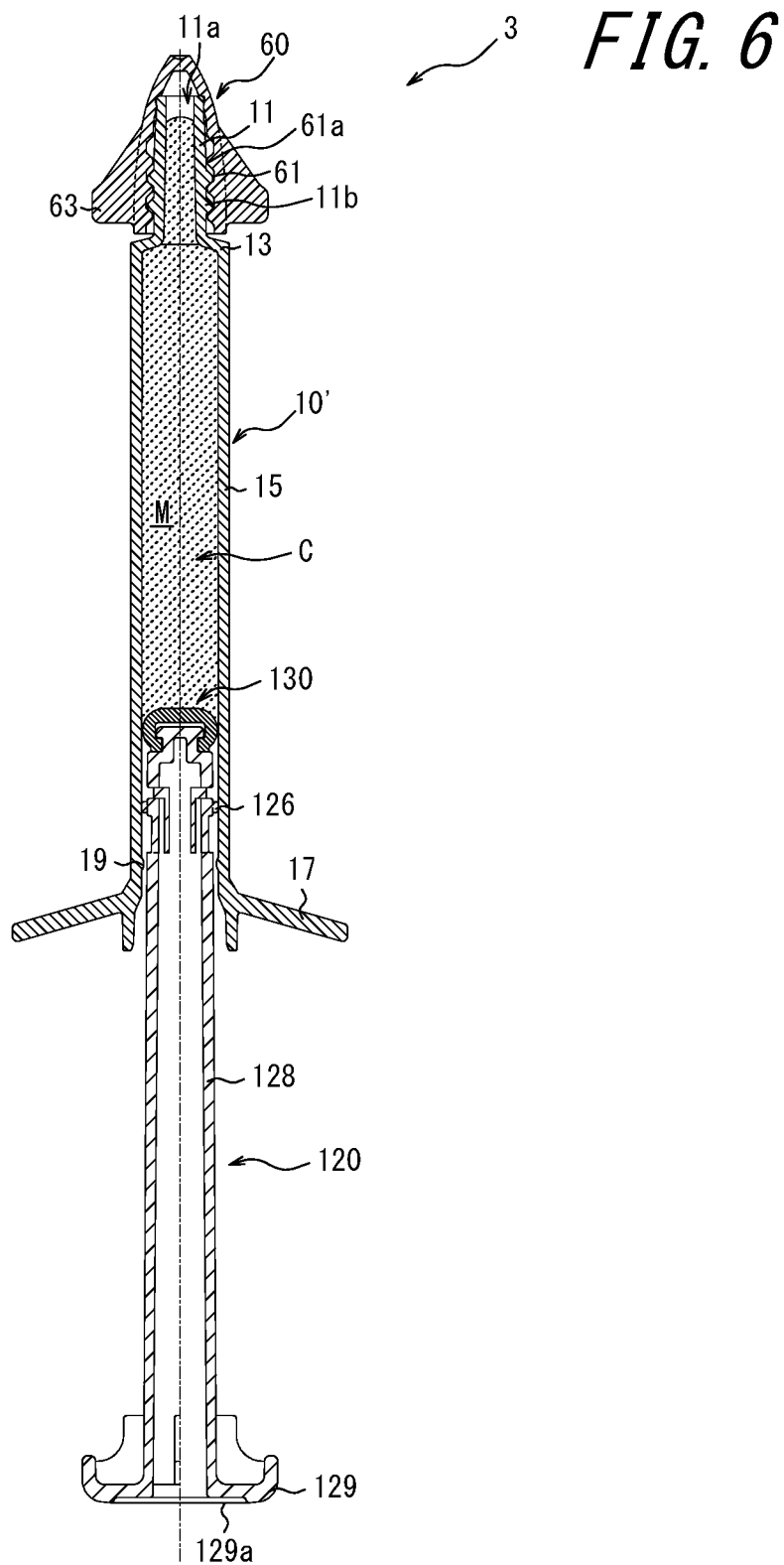
FIG. 6 is a sectional diagram illustrating a dispenser (immediately before start of use) according to Embodiment 3 of the present disclosure.
Figure 7:
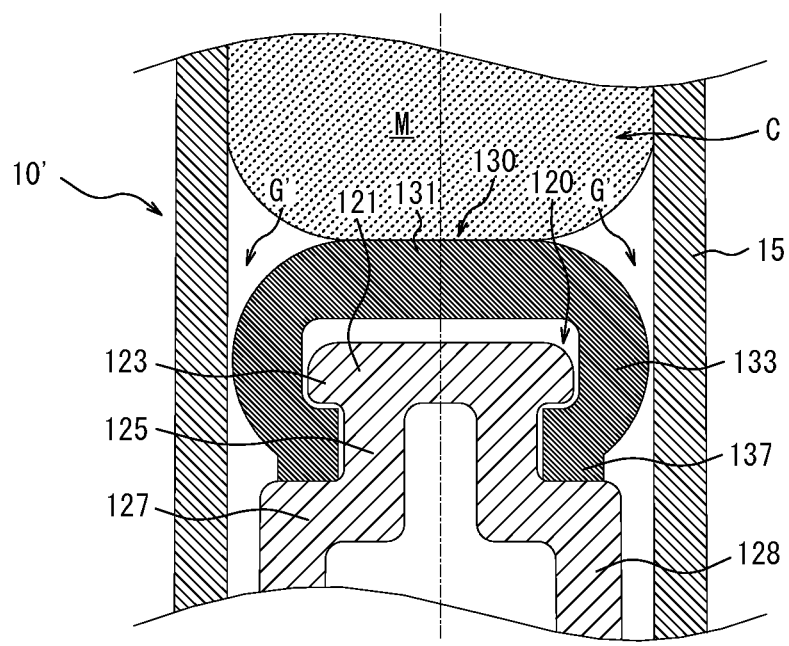
FIG. 7 is an enlarged sectional diagram of a plunger tip part and a piston part in FIG. 6.

FIG. 6 is a sectional diagram illustrating the structure of a dispenser 3 according to Embodiment 3 of the present disclosure. FIG. 7 is an enlarged sectional diagram of a tip part of a plunger 120 and a part of a piston 130. The dispenser 3 illustrated in FIGS. 6 and 7 is in a state immediately before being used by the user. The dispenser 3 according to Embodiment 3 is the same as the dispenser according to Embodiment 2 except the tip shape of the plunger 120 and the shape of the piston 130. The differences from Embodiment 2 are mainly described below.

The plunger 120 is slid in the syringe body 10' in the tip direction, to press the contents C in the filled space M and discharge the contents C through the tip opening 11a. The plunger 120 has, at the tip of a rod portion 128 extending toward the tip opening 11a, a groove portion 125 reduced in diameter in the radial direction and a protrusion portion 123 protruding in the radial direction, as illustrated in FIGS. 6 and 7. By engagement of a back end portion 137 of the piston 130 made of an elastic material such as rubber with the groove portion 125, the piston 130 is fixed to the tip of the plunger 120. A flange 129 is provided at the back end of the plunger 120. By the user pushing a pressing surface 129a of the flange 129, the contents C in the filled space M are discharged to the outside.

The piston 130 is formed of an elastic material such as rubber. As illustrated in FIG. 7, the piston 130 includes: a sidewall 133 whose outer peripheral surface is shaped to project outward and that forms a gap G' with the inner peripheral surface of the syringe body 10'; a tip wall 131 that is connected to the tip side of the sidewall 133; and a back end portion 137 that is connected to the back end side of the sidewall 133 and engages with the groove portion 125 to fix the piston 130 to the plunger 120. The outer peripheral surface of the sidewall 133 of the piston 130 forms the gap G' with the inner peripheral surface of the syringe body 10'. The piston 130 as a whole covers the protrusion portion 123 of the plunger 120.

To discharge the contents C from the dispenser 3 illustrated in FIGS. 6 and 7, as a preparatory step, the manufacturer first fills the filled space M of the syringe body 10' with the contents C. The manufacturer then pushes the plunger 120 into the syringe body 10' in the tip direction, in a state in which the cap 60 is removed from the syringe body 10'. After the manufacturer starts pushing the plunger 120, when the piston 130 is not yet in contact with the contents C in the filled space M, there is the gap G' between the sidewall 133 and the inner peripheral surface of the syringe body 10'. Accordingly, the air in the filled space M escapes in the back end direction through the gap G'. This enables the manufacturer to push the plunger 120 in the tip direction with little resistance. By pushing the plunger 120 in the tip direction, the manufacturer causes the tip wall 131 of the piston 130 to abut the contents C. As a result of further pushing the plunger 120, the piston 130 is subjected to a reaction force from the contents C, and the gap G' narrows. The contents C are thus prevented from leaking in the back end direction. The manufacturer may further push the plunger 120 until the contents C are slightly discharged from the tip opening 11a, to make sure that the piston 130 abuts the contents C. Once the manufacturer has stopped pushing the plunger 120, the piston 130 is no longer subjected to the reaction force from the contents C as the pressing force from the plunger 120 is no longer exerted, so that the gap G' returns to the original state (the state in FIG. 7). Thus, the positive pressure in the filled space M is released, preventing leakage of the contents C from the tip opening 11a. After performing this preparatory step to make the dispenser 3 usable by the user, the manufacturer attaches the cap 60 to the syringe body 10' to block the tip opening 11a. The manufacturer then packs the dispenser 3, and ships it to the user.

Figure 8:
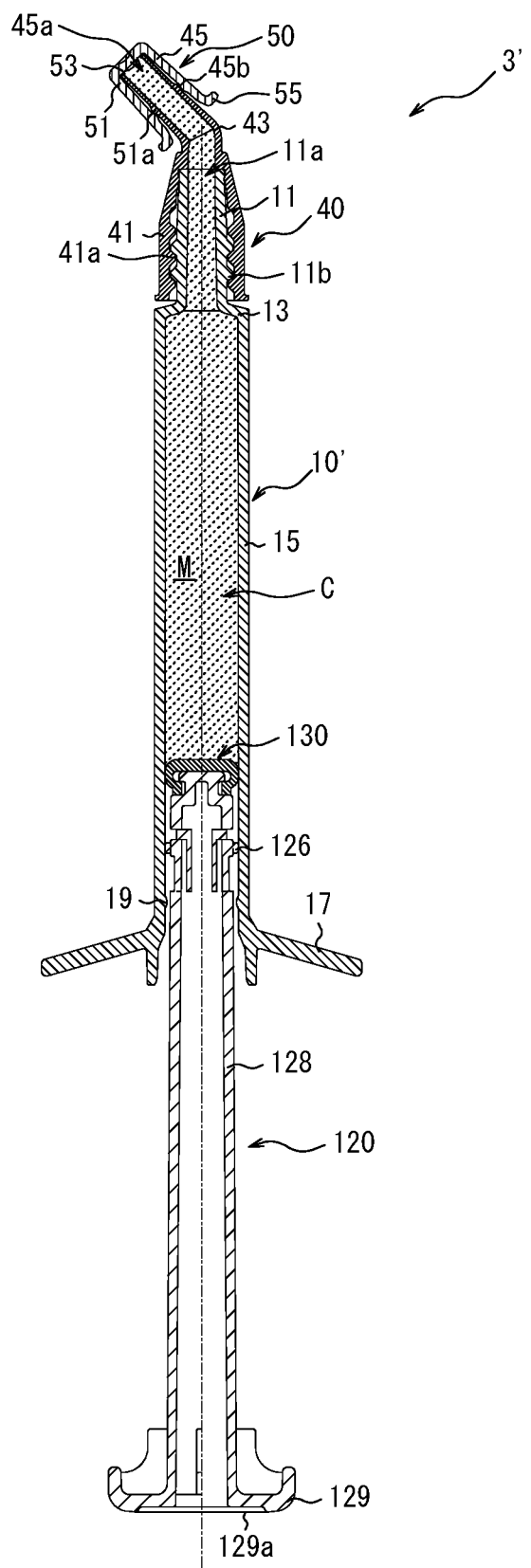
FIG. 8 is a sectional diagram illustrating the dispenser (after start of use) according to Embodiment 3 of the present disclosure.

The user removes the cap 60 of the dispenser 3 that has been made usable as a result of the preparatory step, and instead attaches the nozzle 40 for discharging the contents C. FIG. 8 illustrates this state. The nozzle lid 50 is provided at the tip of the nozzle 40. Reference sign 3' is the dispenser to which the nozzle 40 is attached.

Figure 9:
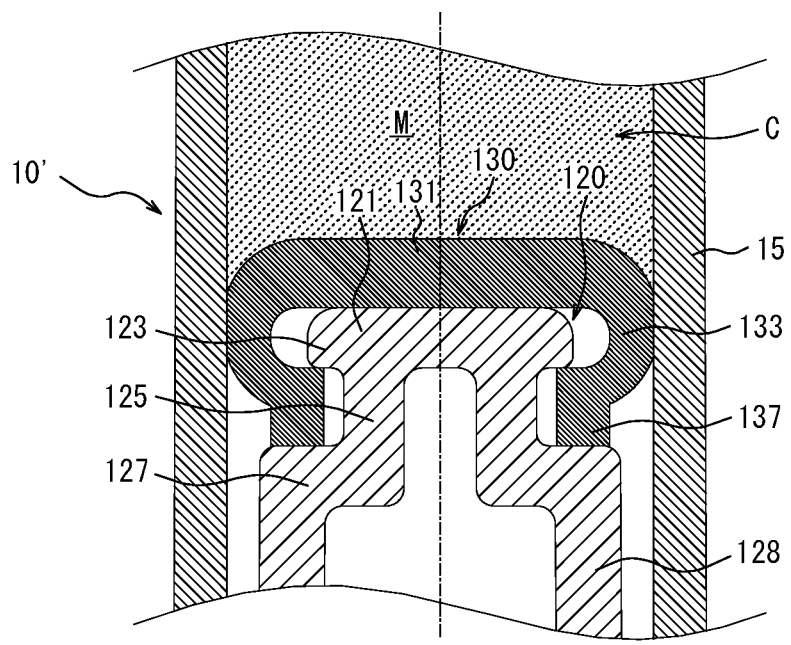
FIG. 9 is an enlarged sectional diagram of the plunger tip part and the piston part in FIG. 8, and illustrates a state in which the gap between the piston and the syringe inner peripheral surface is sealed by pushing the plunger.

To discharge the contents C, the user removes the nozzle lid 50 from the dispenser 3'. The user then presses a pressing surface 129a of the plunger 120, to push the plunger 120 into the syringe body 10' in the tip direction. At this stage, the sidewall 133 and the tip wall 131 of the piston 130 already abut the contents C. Accordingly, when the plunger 120 is further pushed, the tip wall 131 of the piston 130 is subjected to the reaction force from the contents C, and moves in the back end direction relative to the plunger 120 and abuts the tip part of the plunger 120, as illustrated in FIG. 9. Here, the upper end of the sidewall 133 is displaced in the back end direction by the movement of the tip wall 131, while the back end of the sidewall 133 is unmoved because the back end portion 137 abuts the step portion 127 and is prevented from being displaced in the back end direction. Therefore, the sidewall 133 shaped to project outward is further displaced outward. This narrows the gap G' between the sidewall 133 and the inner peripheral surface of the syringe body 10'. In the example illustrated in FIG. 9, the gap G' is zero. When the user pushes the plunger 120 in a state in which the gap G' is zero, the air and the contents C in the filled space M can no longer escape in the back end direction, and positive pressure develops in the filled space M. This positive pressure in the filled space M causes the contents C to be discharged to the outside through the tip opening 11a of the tip cylindrical portion 11 and the nozzle opening 45a of the nozzle cylindrical portion 45.

Although the outer peripheral surface of the sidewall 133 is shaped to project outward in this embodiment, the sidewall 133 is not limited to such. As an example, the inner peripheral surface of the sidewall 133 may be shaped to project outward. As another example, both the outer peripheral surface and the inner peripheral surface of the sidewall 133 may be shaped to project outward.

When the plunger 120 is not pushed in the tip direction, the gap G' between the sidewall 133 and the inner peripheral surface of the syringe body 10' returns to the original state illustrated in FIG. 7 by the restoring force of the piston 130. Accordingly, upon stopping pushing the plunger 120 after discharging the contents C, the positive pressure in the filled space M is released promptly through the gap G'. This prevents the contents C from leaking from the nozzle opening 45a due to the residual pressure in the filled space M after the pressing of the plunger 120 is stopped.

As described above, according to this embodiment, the gap G' is formed between the inner peripheral surface of the syringe body 10' and the sidewall 133 of the piston 130, and the piston 130 deforms so as to reduce the gap G' when the plunger 120 is pushed. The back leakage risk which is the proportion of the area of the gap G' after the deformation of the piston 130 to the area of the nozzle opening 45a (final discharge hole) is preferably less than 1. In this embodiment, the back leakage risk is 0. Thus, when pushing the plunger 120, the sidewall 133 and the tip wall 131 can prevent leakage of the contents C in the back end direction. When stopping pushing the plunger 120 after discharging the contents C, the gap G' returns to the original state, and the positive pressure in the filled space M is promptly released through the gap G'. This prevents the contents C from leaking from the nozzle opening 45a due to the residual pressure in the filled space M after the pressing of the plunger 120 is stopped. When attaching the plunger 120 and the piston 130 to the syringe body 10' after filling the syringe body 10' with the contents C, the plunger 120 and the piston 130 can be easily attached with little resistance while letting the air in the filled space M escape through the gap G' in the back end direction.

Although the disclosed technique has been described by way of the drawings and embodiments, various changes or modifications may be easily made by those of ordinary skill in the art based on the present disclosure. Such various changes or modifications are therefore included in the scope of the present disclosure. For example, the functions included in the components, etc. may be rearranged without logical inconsistency, and a plurality of components, etc. may be combined into one component, etc. and a component, etc. may be divided into a plurality of components, etc. These are also included in the scope of the present disclosure.

INDUSTRIAL APPLICABILITY

It is thus possible to provide a dispenser that prevents leakage of contents from a discharge hole when discharge operation is stopped.

REFERENCE SIGNS LIST 1, 1', 2, 3, 3' dispenser
10, 10' syringe body
11 tip cylindrical portion
11a tip opening
11b male screw portion
15 barrel
17 collar
19 annular projection (protrusion portion)
20, 20', 120 plunger
23, 123 protrusion portion
23a inclined portion
25, 125 groove portion
26, 126 sliding projection portion (sliding portion)
27, 127 step portion
28, 128 rod portion
29, 129 flange
29a, 129a pressing surface
30, 30', 130 piston
31, 131 tip wall
33 seal portion
35 sidewall
37, 137 back end portion
39 sliding rib (sliding portion)
40 nozzle (needle tip)
41 nozzle cap
41a female screw portion
43 bend portion
45 nozzle cylindrical portion
45a nozzle opening (final discharge hole)
45b projection portion
50 nozzle lid
51 sidewall
51a projection portion
55 projection
60 cap
61 cap sidewall
61a female screw portion
63 cap rib
133 sidewall
C contents
G, G' gap
M filled space

The invention claimed is:
1. A dispenser comprising:
a syringe body having a discharge hole at a tip thereof and a fillable space configured to contain contents;
a plunger configured to slide in the syringe body by application of a pushing force and to discharge the contents in the fillable space from the discharge hole; and a piston that (i) is formed of an elastic material, (ii) is located at a tip part of the plunger, and (iii) includes: (a) a ring-shaped seal portion that forms a gap with an inner peripheral surface of the syringe body and (b) a tip wall that covers an inner peripheral surface of the seal portion from a tip side, wherein:

a thickness of the tip wall in a tip direction is smaller than a thickness of the ring-shaped seal portion in the tip direction, the gap is formed between the inner peripheral surface of the syringe body and an outer peripheral surface of the piston, when the plunger is pushed, the piston deforms to narrow the gap, a tip of the plunger includes an inclined portion that decreases in diameter toward the discharge hole, the ring-shaped seal portion is configured to move in a back end direction along the inclined portion and increase in diameter by a reaction force from the contents in the fillable space against the pushing of the plunger, and, when the pushing is stopped, move in the tip direction and decrease in diameter by an elastic force of the tip wall, a back leakage risk after the deformation of the piston is 0 or more and less than 1, the back leakage risk being calculated by dividing an area of the gap by an area of a final discharge hole, and a sliding portion that protrudes outward and that is configured to slide on the inner peripheral surface of the syringe body is provided intermittently in a circumferential direction of the dispenser at at least one of an outer peripheral surface of the plunger and the outer peripheral surface of the piston.

2. The dispenser according to claim 1, wherein the discharge hole is formed by attaching a needle tip to the tip of the syringe body.

3. The dispenser according to claim 1, wherein Shore hardness of the piston measured by a JIS K 6253 type A durometer is 30 or more and 80 or less.

4. The dispenser according to claim 1, wherein an area ratio calculated by dividing a cross-sectional area of inside of the syringe body by the area of the final discharge hole is 20 or less.

5. The dispenser according to claim 1, wherein a protrusion portion that prevents the plunger from separating from the syringe body is provided at the inner peripheral surface of the syringe body.

6. The dispenser according to claim 1, wherein:

the piston includes: a back end portion that abuts the plunger and is prevented from being displaced in a back end direction; a sidewall that extends from the back end portion in the tip direction; and the tip wall that covers the sidewall from the tip side, at least one of an inner peripheral surface and an outer peripheral surface of the sidewall is shaped to project outward, and the sidewall forms the gap with the inner peripheral surface of the syringe body, and the tip wall is configured to move in the back end direction by the reaction force from the contents in the fillable space against the pushing of the plunger, and the sidewall is configured to be displaced outward with the movement of the tip wall.

7. The dispenser according to claim 2, wherein Shore hardness of the piston measured by a JIS K 6253 type A durometer is 30 or more and 80 or less.

8. The dispenser according to claim 2, wherein an area ratio calculated by dividing a cross-sectional area of inside of the syringe body by the area of the final discharge hole is 20 or less.

9. The dispenser according to claim 3, wherein an area ratio calculated by dividing a cross-sectional area of inside of the syringe body by the area of the final discharge hole is 20 or less.

10. The dispenser according to claim 2, wherein a protrusion portion that prevents the plunger from separating from the syringe body is provided at the inner peripheral surface of the syringe body.

11. The dispenser according to claim 3, wherein a protrusion portion that prevents the plunger from separating from the syringe body is provided at the inner peripheral surface of the syringe body.

12. The dispenser according to claim 4, wherein a protrusion portion that prevents the plunger from separating from the syringe body is provided at the inner peripheral surface of the syringe body.

13. The dispenser according to claim 1, wherein, by virtue of the greater thickness of the ring-shaped seal portion relative to the tip wall, the inclined portion of the plunger contacts the ring-shaped seal portion so that the ring-shaped seal portion contacts the inner peripheral surface of the syringe body to seal the gap when the plunger is pushed.

* * * * *